United States Patent
Krishnamurthy

(10) Patent No.: US 8,694,510 B2
(45) Date of Patent: Apr. 8, 2014

(54) INDEXING XML DOCUMENTS EFFICIENTLY

(75) Inventor: Sanjay M. Krishnamurthy, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 958 days.

(21) Appl. No.: 10/848,640

(22) Filed: May 18, 2004

(65) Prior Publication Data

US 2005/0055334 A1 Mar. 10, 2005

Related U.S. Application Data

(60) Provisional application No. 60/500,568, filed on Sep. 4, 2003.

(51) Int. Cl.
*G06F 17/30* (2006.01)

(52) U.S. Cl.
USPC .......................................................... 707/747

(58) Field of Classification Search
USPC ..................... 707/2, 102, 741–747
See application file for complete search history.

(56) References Cited

U.S. PATENT DOCUMENTS

| | | | |
|---|---|---|---|
| 4,993,025 A | 2/1991 | Vesel et al. | |
| 5,202,982 A | 4/1993 | Gramlich et al. | |
| 5,210,686 A | 5/1993 | Jernigan | |
| 5,226,137 A | 7/1993 | Bolan et al. | |
| 5,247,658 A | 9/1993 | Barrett et al. | |
| 5,257,366 A | 10/1993 | Adair et al. | |
| 5,295,256 A | 3/1994 | Bapat | |
| 5,295,261 A | 3/1994 | Simonetti | |
| 5,307,490 A | 4/1994 | Davidson et al. | |
| 5,313,629 A | 5/1994 | Abraham et al. | |

(Continued)

FOREIGN PATENT DOCUMENTS

| | | |
|---|---|---|
| EP | 0856803 | 8/1998 |
| EP | 1 241 589 | 9/2002 |

(Continued)

OTHER PUBLICATIONS

Deschler, Kurt and Elke Rundensteiner, "MASS: A Multi-Axis Storage Structure for Large XML Documents", Computer Science Technical Report Series, Worcester Polytechnic Institute, WPI-CS-TR-02-23, Jun. 2003.*

(Continued)

*Primary Examiner* — Khanh Pham
(74) *Attorney, Agent, or Firm* — Hickman Palermo Truong Becker Bingham Wong LLP

(57) ABSTRACT

Information hierarchies are efficiently stored and accessed in a relational or object-relational database system. A path signature, similar to a pathname, is stored in a database system in association with data for the node identified by the pathname. For example, a path signature identifying an element is stored in a row that holds data for the element. To retrieve data for a hierarchical query that identifies the data requested using, for example, an XPATH string, a string pattern is generated that is matched by path signatures identified by the XPATH string. Pattern matching is then used to select rows associated with matching path signatures, and data from the selected rows is used to compute the XPATH query. Furthermore, hash values representing path signatures are generated in a way that preserves the ordering of data in an information hierarchy. The hash values can be indexed to provide quick access.

14 Claims, 8 Drawing Sheets

(56) References Cited

U.S. PATENT DOCUMENTS

| | | | |
|---|---|---|---|
| 5,327,556 | A | 7/1994 | Mohan et al. |
| 5,369,763 | A | 11/1994 | Biles |
| 5,388,257 | A | 2/1995 | Bauer |
| 5,404,513 | A | 4/1995 | Powers et al. |
| 5,410,691 | A | 4/1995 | Taylor |
| 5,454,101 | A | 9/1995 | Mackay et al. |
| 5,463,772 | A | 10/1995 | Thompson et al. |
| 5,467,471 | A | 11/1995 | Bader |
| 5,499,371 | A | 3/1996 | Henninger et al. |
| 5,504,892 | A | 4/1996 | Atsatt et al. |
| 5,506,991 | A | 4/1996 | Curry et al. |
| 5,524,240 | A | 6/1996 | Barbara et al. |
| 5,530,849 | A | 6/1996 | Hanushevsky et al. |
| 5,544,360 | A | 8/1996 | Lewak et al. |
| 5,546,571 | A | 8/1996 | Shan et al. |
| 5,561,763 | A | 10/1996 | Eto et al. |
| 5,566,331 | A | 10/1996 | Irwin, Jr. et al. |
| 5,568,640 | A | 10/1996 | Nishiyama et al. |
| 5,574,915 | A | 11/1996 | Lemon et al. |
| 5,623,545 | A * | 4/1997 | Childs et al. ................ 708/250 |
| 5,625,815 | A | 4/1997 | Maier et al. |
| 5,630,125 | A | 5/1997 | Zellweger |
| 5,643,633 | A | 7/1997 | Telford et al. |
| 5,680,614 | A | 10/1997 | Bakuya et al. |
| 5,682,524 | A | 10/1997 | Freund et al. |
| 5,684,990 | A | 11/1997 | Boothby |
| 5,689,706 | A | 11/1997 | Rao et al. |
| 5,701,467 | A | 12/1997 | Freeston |
| 5,724,577 | A | 3/1998 | Exley et al. |
| 5,734,887 | A | 3/1998 | Kingberg et al. |
| 5,737,736 | A | 4/1998 | Chang |
| 5,758,153 | A | 5/1998 | Atsatt et al. |
| 5,802,518 | A | 9/1998 | Karaev et al. |
| 5,819,275 | A | 10/1998 | Badger et al. |
| 5,822,511 | A | 10/1998 | Kashyap et al. |
| 5,832,526 | A | 11/1998 | Schuyler |
| 5,838,965 | A | 11/1998 | Kavanagh et al. |
| 5,842,212 | A | 11/1998 | Balluvio et al. |
| 5,848,246 | A | 12/1998 | Gish |
| 5,870,590 | A | 2/1999 | Kita et al. |
| 5,878,410 | A | 3/1999 | Zbikowski et al. |
| 5,878,415 | A | 3/1999 | Olds |
| 5,878,434 | A | 3/1999 | Draper et al. |
| 5,892,535 | A | 4/1999 | Allen et al. |
| 5,905,990 | A | 5/1999 | Inglett |
| 5,915,253 | A | 6/1999 | Christiansen |
| 5,917,492 | A | 6/1999 | Bereiter et al. |
| 5,918,225 | A | 6/1999 | White et al. |
| 5,921,582 | A | 7/1999 | Gusack |
| 5,924,088 | A | 7/1999 | Jakobsson et al. |
| 5,937,406 | A | 8/1999 | Balabine et al. |
| 5,940,591 | A | 8/1999 | Boyle et al. |
| 5,960,194 | A | 9/1999 | Choy et al. |
| 5,964,407 | A | 10/1999 | Sandkleiva |
| 5,974,407 | A | 10/1999 | Sacks |
| 5,978,791 | A | 11/1999 | Farber et al. |
| 5,983,215 | A | 11/1999 | Ross et al. |
| 5,987,506 | A | 11/1999 | Carter et al. |
| 5,991,771 | A | 11/1999 | Falls et al. |
| 5,999,941 | A | 12/1999 | Andersen |
| 6,003,040 | A | 12/1999 | Mital et al. |
| 6,012,067 | A | 1/2000 | Sarkar |
| 6,016,497 | A | 1/2000 | Suver |
| 6,023,706 | A | 2/2000 | Schmuck et al. |
| 6,023,765 | A | 2/2000 | Kuhn |
| 6,029,160 | A | 2/2000 | Cabrera et al. |
| 6,029,175 | A | 2/2000 | Chow et al. |
| 6,038,563 | A | 3/2000 | Bapat et al. |
| 6,052,122 | A | 4/2000 | Sutcliffe et al. |
| 6,055,544 | A | 4/2000 | DeRose et al. |
| 6,061,684 | A | 5/2000 | Glasser et al. |
| 6,088,694 | A | 7/2000 | Burns et al. |
| 6,092,086 | A | 7/2000 | Martin et al. |
| 6,101,500 | A | 8/2000 | Lau |
| 6,111,578 | A | 8/2000 | Tesler |
| 6,112,209 | A | 8/2000 | Gusack |
| 6,115,741 | A | 9/2000 | Domenikos et al. |
| 6,119,118 | A | 9/2000 | Kain, III et al. |
| 6,128,610 | A | 10/2000 | Srinivasan et al. |
| 6,141,655 | A | 10/2000 | Johnson et al. |
| 6,154,741 | A | 11/2000 | Feldman |
| 6,182,121 | B1 | 1/2001 | Wlaschin |
| 6,185,574 | B1 | 2/2001 | Howard et al. |
| 6,189,012 | B1 | 2/2001 | Mital et al. |
| 6,192,273 | B1 | 2/2001 | Igel et al. |
| 6,192,373 | B1 | 2/2001 | Haegele |
| 6,199,195 | B1 | 3/2001 | Goodwin et al. |
| 6,208,993 | B1 | 3/2001 | Shadmon |
| 6,212,512 | B1 | 4/2001 | Barney et al. |
| 6,212,557 | B1 | 4/2001 | Oran |
| 6,230,310 | B1 | 5/2001 | Arrouye et al. |
| 6,233,729 | B1 | 5/2001 | Campara et al. |
| 6,236,988 | B1 | 5/2001 | Aldred |
| 6,240,407 | B1 | 5/2001 | Chang et al. |
| 6,247,024 | B1 | 6/2001 | Kincaid |
| 6,247,108 | B1 * | 6/2001 | Long ................................ 707/1 |
| 6,263,332 | B1 | 7/2001 | Nasr et al. |
| 6,269,380 | B1 | 7/2001 | Terry et al. |
| 6,269,431 | B1 | 7/2001 | Dunham |
| 6,279,006 | B1 | 8/2001 | Shigemi et al. |
| 6,279,007 | B1 | 8/2001 | Uppala |
| 6,298,349 | B1 | 10/2001 | Toyoshima et al. |
| 6,301,605 | B1 | 10/2001 | Napolitano et al. |
| 6,321,219 | B1 | 11/2001 | Gainer et al. |
| 6,330,573 | B1 | 12/2001 | Salisbury et al. |
| 6,339,382 | B1 | 1/2002 | Arbinger et al. |
| 6,341,289 | B1 | 1/2002 | Burroughs et al. |
| 6,343,287 | B1 | 1/2002 | Kumar et al. |
| 6,349,295 | B1 | 2/2002 | Tedesco et al. |
| 6,356,920 | B1 | 3/2002 | Vandersluis |
| 6,366,902 | B1 | 4/2002 | Lyle et al. |
| 6,366,921 | B1 | 4/2002 | Hansen et al. |
| 6,366,934 | B1 | 4/2002 | Cheng et al. |
| 6,366,936 | B1 | 4/2002 | Lee et al. |
| 6,370,537 | B1 | 4/2002 | Gilbert et al. |
| 6,370,548 | B1 | 4/2002 | Bauer et al. |
| 6,381,607 | B1 | 4/2002 | Wu et al. |
| 6,389,427 | B1 | 5/2002 | Faulkner |
| 6,389,433 | B1 | 5/2002 | Bolosky et al. |
| 6,393,435 | B1 | 5/2002 | Gartner et al. |
| 6,397,231 | B1 | 5/2002 | Salisbury et al. |
| 6,418,448 | B1 | 7/2002 | Sarkar |
| 6,421,656 | B1 | 7/2002 | Cheng et al. |
| 6,421,692 | B1 | 7/2002 | Milne et al. |
| 6,427,123 | B1 | 7/2002 | Sedlar |
| 6,438,540 | B2 | 8/2002 | Nasr et al. |
| 6,438,550 | B1 | 8/2002 | Doyle et al. |
| 6,438,562 | B1 | 8/2002 | Gupta et al. |
| 6,442,548 | B1 | 8/2002 | Balabine et al. |
| 6,446,091 | B1 | 9/2002 | Noren et al. |
| 6,449,620 | B1 | 9/2002 | Draper et al. |
| 6,470,344 | B1 | 10/2002 | Kothuri et al. |
| 6,487,546 | B1 | 11/2002 | Witkowski |
| 6,496,842 | B1 | 12/2002 | Lyness |
| 6,510,434 | B1 | 1/2003 | Anderson et al. |
| 6,519,597 | B1 | 2/2003 | Cheng et al. |
| 6,539,398 | B1 | 3/2003 | Hannan et al. |
| 6,542,898 | B1 | 4/2003 | Sullivan et al. |
| 6,547,829 | B1 | 4/2003 | Meyerzon et al. |
| 6,571,231 | B2 | 5/2003 | Sedlar |
| 6,574,655 | B1 | 6/2003 | Libert et al. |
| 6,584,459 | B1 * | 6/2003 | Chang et al. ..................... 707/3 |
| 6,594,675 | B1 | 7/2003 | Schneider |
| 6,604,100 | B1 | 8/2003 | Fernandez et al. |
| 6,609,121 | B1 | 8/2003 | Ambrosini et al. |
| 6,611,843 | B1 | 8/2003 | Jacobs |
| 6,631,366 | B1 | 10/2003 | Nagavamsi et al. |
| 6,636,845 | B2 | 10/2003 | Chau et al. |
| 6,643,633 | B2 * | 11/2003 | Chau et al. ..................... 707/1 |
| 6,654,734 | B1 | 11/2003 | Mani et al. |
| 6,675,230 | B1 | 1/2004 | Lewallen |
| 6,681,221 | B1 | 1/2004 | Jacobs |
| 6,684,227 | B2 | 1/2004 | Duxbury |
| 6,697,805 | B1 | 2/2004 | Choquier et al. |

(56) References Cited

U.S. PATENT DOCUMENTS

| | | |
|---|---|---|
| 6,704,739 B2 | 3/2004 | Craft et al. |
| 6,704,747 B1 | 3/2004 | Fong |
| 6,708,186 B1 | 3/2004 | Claborn et al. |
| 6,718,322 B1 | 4/2004 | Brye |
| 6,721,723 B1 | 4/2004 | Gibson et al. |
| 6,725,212 B2 | 4/2004 | Couch et al. |
| 6,732,222 B1 | 5/2004 | Garritsen et al. |
| 6,754,661 B1 | 6/2004 | Hallin et al. |
| 6,772,350 B1 | 8/2004 | Belani et al. |
| 6,778,977 B1 | 8/2004 | Avadhanam et al. |
| 6,782,380 B1 | 8/2004 | Thede |
| 6,785,673 B1 | 8/2004 | Fernandez et al. |
| 6,795,821 B2 | 9/2004 | Yu |
| 6,804,677 B2 * | 10/2004 | Shadmon et al. ............. 707/101 |
| 6,826,568 B2 | 11/2004 | Bernstein et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,871,204 B2 | 3/2005 | Krishnaprasad et al. |
| 6,915,304 B2 | 7/2005 | Krupa |
| 6,915,307 B1 | 7/2005 | Mattis et al. |
| 6,920,457 B2 | 7/2005 | Pressmar |
| 6,964,025 B2 | 11/2005 | Angiulo et al. |
| 6,965,894 B2 | 11/2005 | Leung et al. |
| 6,983,322 B1 | 1/2006 | Tripp et al. |
| 7,031,956 B1 | 4/2006 | Lee et al. |
| 7,043,487 B2 * | 5/2006 | Krishnamurthy et al. .... 707/100 |
| 7,043,488 B1 | 5/2006 | Baer et al. |
| 7,047,253 B1 * | 5/2006 | Murthy et al. ............ 707/103 R |
| 7,062,507 B2 * | 6/2006 | Wang et al. ................... 707/102 |
| 7,089,239 B1 | 8/2006 | Baer et al. |
| 7,096,224 B2 | 8/2006 | Murthy et al. |
| 7,107,282 B1 * | 9/2006 | Yalamanchi ................. 707/102 |
| 7,139,746 B2 | 11/2006 | Shin et al. |
| 7,139,747 B1 | 11/2006 | Najor |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,174,328 B2 | 2/2007 | Stanoi et al. |
| 7,181,438 B1 | 2/2007 | Szabo |
| 7,216,127 B2 | 5/2007 | Auerbach |
| 7,269,601 B2 | 9/2007 | Kinno et al. |
| 7,287,033 B2 * | 10/2007 | Shadmon et al. ............. 707/101 |
| 7,353,222 B2 * | 4/2008 | Dodds et al. ...................... 707/3 |
| 7,363,326 B2 * | 4/2008 | Margolus ..................... 707/201 |
| 7,475,061 B2 | 1/2009 | Bargeron et al. |
| 7,505,985 B2 | 3/2009 | Kilroy |
| 7,519,903 B2 * | 4/2009 | Yahagi .......................... 715/234 |
| 2001/0037345 A1 | 11/2001 | Kiernan et al. |
| 2001/0049675 A1 * | 12/2001 | Mandler et al. .................... 707/1 |
| 2002/0015042 A1 | 2/2002 | Robotham et al. |
| 2002/0023069 A1 * | 2/2002 | Blank et al. ........................ 707/1 |
| 2002/0035606 A1 | 3/2002 | Kenton |
| 2002/0038358 A1 | 3/2002 | Sweatt, III et al. |
| 2002/0056025 A1 | 5/2002 | Qiu et al. |
| 2002/0078068 A1 | 6/2002 | Krishnaprasad et al. |
| 2002/0087596 A1 | 7/2002 | Lewontin |
| 2002/0095421 A1 | 7/2002 | Koskas |
| 2002/0099687 A1 | 7/2002 | Maluf et al. |
| 2002/0116371 A1 | 8/2002 | Dodds et al. |
| 2002/0120685 A1 | 8/2002 | Srivastava et al. |
| 2002/0123993 A1 | 9/2002 | Chau et al. |
| 2002/0124100 A1 | 9/2002 | Adams |
| 2002/0133484 A1 | 9/2002 | Chau et al. |
| 2002/0143512 A1 | 10/2002 | Shamoto et al. |
| 2002/0143755 A1 | 10/2002 | Wynblatt et al. |
| 2002/0152267 A1 | 10/2002 | Lennon |
| 2002/0156772 A1 | 10/2002 | Chau et al. |
| 2002/0156811 A1 | 10/2002 | Krupa |
| 2002/0167788 A1 | 11/2002 | Kulakowski et al. |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0033285 A1 | 2/2003 | Jalali et al. |
| 2003/0065659 A1 | 4/2003 | Agarwal et al. |
| 2003/0078906 A1 | 4/2003 | Ten-Hove et al. |
| 2003/0084056 A1 | 5/2003 | DeAnna et al. |
| 2003/0093672 A1 | 5/2003 | Cichowlas |
| 2003/0101169 A1 | 5/2003 | Bhatt et al. |
| 2003/0101194 A1 | 5/2003 | Rys et al. |
| 2003/0105732 A1 | 6/2003 | Kagalwala et al. |
| 2003/0131051 A1 | 7/2003 | Lection et al. |
| 2003/0140308 A1 | 7/2003 | Murthy et al. |
| 2003/0158897 A1 | 8/2003 | Ben-Natan et al. |
| 2003/0167277 A1 | 9/2003 | Hejlsberg et al. |
| 2003/0172135 A1 | 9/2003 | Bobick et al. |
| 2003/0177341 A1 | 9/2003 | Devillers |
| 2003/0182461 A1 | 9/2003 | Stelting et al. |
| 2003/0182624 A1 | 9/2003 | Large |
| 2003/0212662 A1 | 11/2003 | Shin et al. |
| 2003/0212664 A1 | 11/2003 | Breining et al. |
| 2003/0226111 A1 | 12/2003 | Wirts et al. |
| 2003/0233618 A1 | 12/2003 | Wan |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0044959 A1 * | 3/2004 | Shanmugasundaram et al. ............................ 715/513 |
| 2004/0064466 A1 | 4/2004 | Manikutty et al. |
| 2004/0073541 A1 | 4/2004 | Lindblad et al. |
| 2004/0083222 A1 | 4/2004 | Pecherer |
| 2004/0088320 A1 | 5/2004 | Perry |
| 2004/0088415 A1 | 5/2004 | Chandrasekar et al. |
| 2004/0103105 A1 * | 5/2004 | Lindblad et al. ............. 707/100 |
| 2004/0103282 A1 | 5/2004 | Meier et al. |
| 2004/0148278 A1 | 7/2004 | Milo et al. |
| 2004/0167864 A1 * | 8/2004 | Wang et al. ........................ 707/1 |
| 2004/0176958 A1 | 9/2004 | Salmenkaita et al. |
| 2004/0177080 A1 | 9/2004 | Doise et al. |
| 2004/0205551 A1 | 10/2004 | Santos |
| 2004/0215600 A1 | 10/2004 | Aridor et al. |
| 2004/0220912 A1 | 11/2004 | Manikutty et al. |
| 2004/0220927 A1 | 11/2004 | Murthy et al. |
| 2004/0220946 A1 | 11/2004 | Krishnaprasad et al. |
| 2004/0221226 A1 | 11/2004 | Lin et al. |
| 2004/0225680 A1 | 11/2004 | Cameron et al. |
| 2004/0230667 A1 | 11/2004 | Wookey |
| 2004/0230893 A1 | 11/2004 | Elza et al. |
| 2004/0255046 A1 | 12/2004 | Ringseth et al. |
| 2004/0267760 A1 | 12/2004 | Brundage et al. |
| 2005/0005072 A1 * | 1/2005 | Pruvost et al. ................. 711/148 |
| 2005/0010896 A1 | 1/2005 | Meliksetian et al. |
| 2005/0038688 A1 | 2/2005 | Collins et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0055343 A1 * | 3/2005 | Krishnamurthy ................. 707/3 |
| 2005/0055355 A1 | 3/2005 | Murthy et al. |
| 2005/0091183 A1 | 4/2005 | Cunningham et al. |
| 2005/0091188 A1 | 4/2005 | Pal et al. |
| 2005/0097084 A1 | 5/2005 | Balmin et al. |
| 2005/0097108 A1 | 5/2005 | Wang et al. |
| 2005/0102256 A1 | 5/2005 | Bordawekar et al. |
| 2005/0108630 A1 | 5/2005 | Wasson et al. |
| 2005/0114314 A1 | 5/2005 | Fan et al. |
| 2005/0120029 A1 | 6/2005 | Tomic et al. |
| 2005/0120031 A1 | 6/2005 | Ishii |
| 2005/0138047 A1 | 6/2005 | Liu et al. |
| 2005/0160108 A1 | 7/2005 | Charlet et al. |
| 2005/0228786 A1 | 10/2005 | Murthy et al. |
| 2005/0228792 A1 | 10/2005 | Chandrasekaran et al. |
| 2005/0228818 A1 | 10/2005 | Murthy et al. |
| 2005/0229158 A1 | 10/2005 | Thusoo et al. |
| 2005/0240624 A1 | 10/2005 | Ge et al. |
| 2005/0257201 A1 | 11/2005 | Rose et al. |
| 2005/0289125 A1 | 12/2005 | Liu et al. |
| 2005/0289138 A1 | 12/2005 | Cheng et al. |
| 2005/0289175 A1 | 12/2005 | Krishnaprasad et al. |
| 2006/0031204 A1 | 2/2006 | Liu et al. |

(56) References Cited

U.S. PATENT DOCUMENTS

| | | | |
|---|---|---|---|
| 2006/0031233 A1 | 2/2006 | Liu et al. | |
| 2006/0047646 A1 | 3/2006 | Krishnaprasad et al. | |
| 2006/0101320 A1 | 5/2006 | Dodds et al. | |
| 2006/0129584 A1 | 6/2006 | Hoang et al. | |
| 2006/0195420 A1 | 8/2006 | Kilroy | |
| 2006/0195421 A1 | 8/2006 | Kilroy | |
| 2006/0195427 A1 | 8/2006 | Kilroy | |
| 2006/0242563 A1 | 10/2006 | Liu et al. | |
| 2007/0168327 A1* | 7/2007 | Lindblad et al. | 707/2 |
| 2007/0250480 A1 | 10/2007 | Najork | |
| 2009/0222450 A1 | 9/2009 | Zigelman | |

FOREIGN PATENT DOCUMENTS

| | | |
|---|---|---|
| GB | 2409078 A | 6/2005 |
| WO | WO 97/46956 | 12/1997 |
| WO | WO 00/14632 | 3/2000 |
| WO | WO 00/49533 | 8/2000 |
| WO | WO 01/42881 | 6/2001 |
| WO | WO 0142881 A2 | 6/2001 |
| WO | WO 01/59602 | 8/2001 |
| WO | WO 01/61566 | 8/2001 |
| WO | WO 03/027908 | 4/2003 |

OTHER PUBLICATIONS

Mackenzie, David et al., FindUtils, Version 4.1.2 "Finding Files" User Manual and Program, GNU.org, Nov. 1994.*

Maruyama, H., Digest Values for DOM (DOMHASH), RFC2803, http://ietf.org, Apr. 2000.*

W3C, XML Path Language (XPATH), Version 1.0, http://www.w3.org/TR/xpath, Nov. 1999.*

Tatarinov, Igor et al. "Storing and querying ordered XML using a relational database system", Proceedings of the 2002 ACM SIGMOD International Conference on Management of Data, 2002, pp. 204-215.*

Cormen, T. et al., "Introduction to Algorithms", MIT Press, 1992, p. 969.*

W3C Working Draft, XML Path Language (XPath) 2.0, http://www.w3.org/TR/2003/WD-xpath20-20030502/, May 2003, pp. 1-10.*

Chung, et al., "APEX: an adapative path index for XML data", Jun. 30, 2002, ACM SIGMOD Conference 2002, p. 121-132.*

Cormen, et al., "Introduction to Algorithms", 2001, MIT Press, 2nd Ed., p. 224-225.*

IEEE, The Authoritative Dictionary of IEEE Standards Terms, 2000, 7th Ed., p. 433, 800.*

Mak, et al, "Dynamic Structuring of Web Information for Access Visualization", Mar. 2002, Proceedings of the 2002 ACM symposium on Applied computing, p. 778-784.*

Levy et al., "Distributed File Systems: Concepts and Examples", Dec. 1990, ACM Computing Surveys, vol. 22, No. 4, p. 1, 355-356.*

Mackenzie et al., "FindUtils, Version 4.1.2, Finding Files" Source Code, GNU.org, Nov. 31, 1994, source files, code.c ; p. 1-3.*

Cormen et al., "Introduction to Algorithms", MIT Press, 2001, 2nd Ed., p. 222-223.*

Lo et al., "XAS: A System for Accessing Componentized, Virtual XML Documents", May 2001, Proceedings of ICSE'01, IEEE Press, p. 493-502, <Retrieved from IEEE Xplore May 4, 2009>.*

Meyer et al, "GenDB-an open source genome annotation system for prokaryote genomes", Apr. 2003, Nucleic Acids Research, p. 2187-2195.*

Shah et al, "Pegasys: software for executing and integrating analyses of biological sequences", Apr. 2004, BMC Bioinformatics, p. 1-16, <Retrieved from BioMed Central, May 4, 2009>.*

Mungall et al, "An integrated computational pipeline and database to support whole-genome sequence annotation", Dec. 2002, GenomeBiology.com, p. 1-11, <Retrieved from GenomeBiology May 4, 2002>.*

W3C XML Path Language (XPATH), Version 1.0 http://www.w3org/TR/xpath, Nov. 1999.

Tatarinov, Igor et al., Storing and Querying Ordered XML Using a Relational Database System, Proceedings of the 2002 ACM SIGMOD International Conference on Management of Data, 2002 pp. 204-215.

Weigel, Felix, "A Survey of Indexing Techniques for Semistructured Documents" Institut Für Informtik, Feb. 2002.

Maruyama, H., et al., Digest Values for DOM (DOMHASH), RFC2803, http://ietf.org, Apr. 2000.

Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.

Banerjee, Sandeep et al., "Oracle8i—The XML Enabled Data Management System"—Oracle Corporation:, Mar. 2000, IEEE, pp. 561-568.

Bohannon, Philip et al., "From XML Schema to Relations: A Cost-Based Approach to XML Storage"—Bell Laboratories: IEEE—2002—Proceedings of the 18th International Conference on Data Engineering (ICDE '02), pp. 1-.

Bourret, R. et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. of the 1st Inter. Symposium on Information and Communication, pp. 267-272.

Cheng, Josephine, et al., "IBM DB2 XML Extender, An end-to-end solution for storing and retrieving XML documents," IEEE, ICDE '00 Conference, San Diego, Feb. 2000, 128 pages.

Choi, Byron et al., "The XQuey Formal Semantics: A Foundation for Implementation Optimization," May 31, 2002, IEEE XP-002353605, 15 pages.

Cooper, Brian F. et al., "A Fast Index for Semistructured Data," Proceeding of the International Conference on Very Large Databases, 2001, XP-002303292, pp. 341-350.

Dayen, I., "Storing XML in Relational Databases", XML.COM XP-002275971(1998-2004) pp. 1-13.

Diao, Y. et al., "Path Sharing and Predicate Evaluation for High-Performance XML Filtering" XP-002344354 *ACM Transactions on Database Systems* (2003), pp. 467-516.

Diao, Y. et al., "YFilter: Efficient and Scalable Filtering of XML Documents" *IEEE* (2002) 2 pages.

Drake, Mark et al., Oracle Corporation, "Understanding the Oracle9i XML Type," Nov. 1, 2001, http://otn.oracle.com/oramag/oracle/01-nov/o61xml.html?_template=/ocom/technology, data retrieved Jun. 29, 2004, pp. 1-5.

Draper, Denise, Mapping Between XML and Relational Data [online], Feb. 6, 2004 [retrieved on Aug. 17, 2004]. Retrieved from the Internet: <http://www.awprofessional.com/articles/printerfriendly.asp?p=169590>.

Funderbunk, J. et al., "XML programming with SQL/XML and XQuery", *IBM Systems Journal* XP-002295973 (2002) pp. 642-665.

Gennick, Johnathan, Oracle Corporation, "SQL in, XML out," May 1, 2003, http://otn.oracle.com/oramag/oracle/03-may/o33xml.html?_template=/ocom/technology, data retrieved Jun. 29, 2004, pp. 1-4.

Helmer, S. et al., "Optimized Translations of XPath into Algebraic Expressions Parameterized by Programs Containing Navigational Primitives" *IEEE* (2002) 10 pages.

Hierarchical Queries, XP-002295972, pp. 8-3 to 8-7.

(56) References Cited

OTHER PUBLICATIONS

Jajodia, Sushil, et al., "Toward a Multilevel Secure Relational Data Model," ACM, 1991, 8393 SIGMOD Record, Jun. 20, 1991, No. 2, New York, US, XP 000364619, pp. 50-59.
Jonah, Kevin, Databases Tag Along with XML [online], Jul. 1, 2002, [retrieved on Aug. 17, 2004]. Retrieved from the Internet: <http://www.gcn.com/21_17/guide/19148-1.html>.
Kang, Ji-Hoon et al., "An XQuery Engine for Digital Library Systems that support XML data," Proceedings of the 2004 International Symposium on Application and the Internet Workshops, IEEE XP-0010684128, 5 pages.
Katz, Howard et al., "Integrating XQuery and Relational Database Systems," Chapter 7 (Michael Rys)—*XQuery from the Experts: A Guide to the W3C XML Query Language*, Addison Wesley Professional, Aug. 22, 2003, ISBM 978-0-321-18060-5, pp. 353-391.
Khan, Latifur, et al., "A Performance Evaluation of Storing XML Data in Relational Database Management Systems" ACM-2001 (pp. 31-38).
Kudrass, Thomas, "Management of XML Documents Without Schema in Relational Database Systems," Information and Software Technology, vol. 44, No. 4, Mar. 31, 2002, XP-004347776, pp. 269-275.
Lehmann, Mike, From XML to Storage and Back [online], [retrieved on Aug. 17, 2004]. Retrieved from the Internet: <http://www.oracle.com/technology/oramag/oracle/03-mar/o23xml.html>.
Lo et al., "XAS: A System for Accessing Componentized, Virtual XML Documents," IEEE, 2001, pp. 493-502.
Manolescu, Dragos, "Review of Metadata solutions: using metamodels, repositories, XML, and enterprise portals to generate information on demand by Adrienne Tannenbaum", Mar. 2003, ACM Press, vol. 28, Issue 2, p. 38.
McHugh, Jason, et al. "Indexing Semistructured Data," Stanford Science Department, 1998, XP-002248313, pp. 1-21.
McHugh, Jason et al., "Query Optimization for XML", XP-002333353, Proceedings of the 25th VLDB Conference (1999) pp. 315-326.
Melton, Jim, "ISO-ANSI Working Draft, XML-Related Specifications (SQL/XML)," WG3: DRS-020, H2-2002-365, Aug. 2002, 154 pages, ISO-9075-14:200xE.
Michell, Nancy, Data Shredding, Updating the Status Bar, and More [online], Feb. 2003, [retrieved on Aug. 17, 2004]. Retrieved from the Internet: <http://msdn.microsoft.com/msdnmag/issues/03/03/WebQA/>.
Murthy, Ravi et al., "XML Schemas in Oracle XML DB," Proceedings of the 29th VLDB Conference, 2003, IEEE XP-002353604, pp. 1009-1018.
Myllymaki, Jussi, "Effective Wed data Extraction with Standard XML Technologies," WWW10, May 1-5, 2001, pp. 689-696.
Noser, Hansrudi, et al., "Dynamic 3D Visualization of Database-Defined Tree Structures on the WWW by Using Rewriting Systems," 2000, IEEE, XP-002262516, pp. 247-254.
Oracle Corporation, "Oracle9*i* XML Database Developer's Guide—Oracle XML DB," Release 2 (9.2), Mar. 2002, Part No. A96620-1, pp. 5-8-5-10, 5-21-5-24, 5-52-5-70, 10-5-10-20 and 11-1-11-20.
Oracle, "Oracle iFS (Internet File System)," Mar. 1999, XP-002204710, 3 pages.
Oracle, "Oracle9*i* Application Server, Administrator's Guide," Release 2 (9.0.2), May 2002, Part No. A92171-02, Part No. A92171-02, pp. 1-392.
Park, Joon S., "Towards Secure Collaboration on the Semantic Web" (2003) ACM Press, vol. 33, Issue 2, pp. 1-10.
Peng, Feng et al., "XPath queries on streaming data", 2003, ACM Press, pp. 431-442.
Ramakrishnan, Raghu et al., "SRQL: Sorted Relational Query Language", Jul. 1-3, 1998 IEEE pp. 84-95.
Rao, Herman Chung-Hwa, et al., "An Overview of the Internet File System," 1997, IEEE, XP-002204711, pp. 474-477.
Ricardo, Catherine, "Database Systems: Principles, Design, & Implementation," 1990, MacMillian Publishing Co., pp. 357-361, 379-380.
Schmidt et al.—"Efficient Relational Storage and Retrieval of XML Documents"—CWI, The Netherlands (pp. 1-6).
Schmidt et al., "Why and How to Benchmark XML Databases," SIGMOND Record, vol. 3, No. 3, Sep. 2001, pp. 27-32.
Shanmugasundaram, Jayavel, et al., "Querying XML Views of Relational Data," Proceedings of the 27th Very Large Databases Conference, Rome, Italy, Sep. 2001, pp. 261-270.
Thekkath, Chandramohan A. et al., "Implementing network protocols at user level" (1993) ACM Press, pp. 64-73.
Vion-Dury, Jean-Yves, "XPath on left and right sides of rules: toward compact XML tree rewriting through node patterns", 2003, ACM Press, pp. 19-25.
Vorthmann, Scott, et al., "Beyond Schemas, Schema Adjuncts and the Outside World," Markup Languages, Online!, vol. 2, No. 3, Jun. 2000, pp. 1-8.
W3C, "Extensible Markup Language (XML) 1.0 (Third Edition)", W3C Recommendation, dated Feb. 4, 2004, 34 pages.
W3C, "XML Fragment Interchange," W3C Working Draft, Jun. 30, 1999, XP-002167090, 17 pages.
W3C, "XML Path Language (XPath) 2.0," W3C Working Draft Dated Apr. 4, 2005, 89 pages.
W3C, "XML Schema Part 1: Structures," W3C Recommendation, May 2, 2001, http://www.w3.org/TR/2001/REC-xmlschema-1-20010502/, pp. 1-392.
W3C, "XML Schema Part 2: Datatypes," W3C Recommendation, May 2, 2001, http://www.w3.org/TR/2001/REC-xmlschema-2-20010502/, pp. 1-146.
W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.
W3C, "XQuery 1.0: An XML Query Language," W3C Working Draft dated Apr. 4, 2005, 170 pages.
W3C, XML Path Language (XPath) Version 1.0, W3C Recommendation Nov. 16, 1999 [online] Copyright 1999 [retrieved on Aug. 16, 2004]. Retrieved from the Internet: http://www.w3.org/TR/xpath.
Wallach, Deborah A. et al., "ASHs: Application-specific handlers for high-performance messaging" (1996) ACM Press, pp. 1-13.
Yoshikawa, Masatoshi et al., "XRel: A Path-Based Approach to Storage and Retrieval of XML Documents Using Relational Databases", XP-001143686, ACM Transactions on Internet Technology (2001), pp. 110-141.
Zemke, Fred, "XMLQuery," Change Proposal, ISO/IEC JTC1/SC32 WG3:SIA-nnn ANSI NCITS H2-2004-02lrl, Mar. 14, 2004, 29 pages.
Zhang, Hui et al., "XQuery rewriting at the relational algebra level," Computer Systems Science and Engineering, vol. 18, No. 5, Sep. 2003, IEEE XP-009056809, pp. 241-262.
Zhang, Wansong, et al., "An Encoding Scheme for Indexing XML Data," E-Commerce and E-Service, 2004, XP-010697639, pp. 526-529.
International Preliminary Examination Report, Application No. PCT/US02/30783, Apr. 1, 2004, 15 pages.
Current claims in PCT/US02/30783, pp. 1-8.
Written Opinion, Application No. PCT/US03/35551, Nov. 10, 2004, 6 pages.
Current claims in PCT/US03/35551, pp. 1-4.
International Searching Authority, "Notification of Transmittal of the International Search Report and the Written Opinion of the International Authority, or the Declaration," Nov. 2, 2004, PCT/US2004/010018, 14 pages.
PCT/US2004/010018—current claims.
Claims, Foreign Application No. 200580018627.9, 3 pages.
State Intellectual Property Office of P.R.C., "Notification of the First Office Action", Foreign Application No. 200580018627.9, mailed Oct. 12, 2007, 9 pages.
Jurgens, Marcus, et al., "PISA: Performance Models for Index Structures with and without Aggregated data", German Research Society, 1999, 7 pages.
Pal, Shankar et al., "Indexing XML Data Stored in a Relational Database", Proceedings of the $30^{th}$ VLDB Conference, 2004, 12 pages.

(56) References Cited

OTHER PUBLICATIONS

"Notice of Allowance and Fee Due" received in U.S. Appl. No. 10/944,170 dated Apr. 7, 2008, 8 pages.

Girardot et al., "Millau: an encoding format for efficient representation and exchange of XML over the Web", IBM Almaden Research Center, 24 pages.

Shankar Pal et al., "Indexing XML Data Stored in a Relational Database", Proceedings of the 30th VLDB Conference, 2004, 12 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Japanese Patent Office, "Notice of Grounds of Rejection", Patent application No. 533163/2003, mailed Aug. 19, 2008 / 7 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

U.S. Appl. No. 11/641,419, filed Dec. 18, 2006, Office Action, May 10, 2010.

U.S. Appl. No. 10/648,600, filed Aug. 25, 2003, Notice of Allowance, Jun. 3, 2010.

U.S. Appl. No. 10/848,653, filed May 18, 2005, Notice of Allowance, Mar. 23, 2012.

\* cited by examiner

XML DOCUMENT 101

```
<A id="0">
    <B id="100" x="sanjay">
        "This is text"
    </B>
    <C id="200" y="55">
        <D id="300" x="krishna">
            "More text"
        </D>
    </C>
</A>
```

RELATIONAL TABLE NT 301

| PATH SIGNATURE 302 | NODE NAME 304 | VALUE 306 |
|---|---|---|
| '/A/@id' | id | 0 |
| '/A/B/@id' | id | 100 |
| '/A/B/@x' | x | sanjay |
| '/A/B' | B | This is text |
| '/A/C/@id' | id | 200 |
| '/A/C/@y' | y | 55 |
| '/A/C/D/@id' | id | 300 |
| '/A/C/D/@x' | x | krishna |
| '/A/C/D' | D | More text |

| XPATH QUERY | PATTERN MATCHING LITERAL (used to search rows in table 301 with matching path sigs.) |
|---|---|
| '/A/C/' | '/A/C/%' |
| '/A//D/' | '/A/%/D/' |

Grid 401

RELATIONAL TABLE NT-501

| HASH PATH SIGNATURE 502 | NODE NAME 504 | VALUE 506 |
|---|---|---|
| 15000012 | id | 0 |
| 15160012 | id | 100 |
| 15160098 | x | sanjay |
| 15160000 | B | This is text |
| 15170012 | id | 200 |
| 15170096 | y | 55 |
| 15171812 | id | 300 |
| 15171898 | x | krishna |
| 15171800 | D | More text |

Row labels: 511, 512, 513, 514, 515, 516, 517, 518, 519

INDEX 530

| HASH PATH SIGNATURES | ROW-IDS |
|---|---|
| 15000012 | 511 |
| 15160000 | 514 |
| 15160012 | 512 |
| 15160098 | 513 |
| 15170012 | 515 |
| 15170096 | 516 |
| 15171800 | 519 |
| 15171812 | 517 |
| 15171898 | 518 |

Row labels: 531, 532, 533, 534, 535, 536, 537, 538, 539

Psuedocode 701 generate hashvalue(node X)

hashvalue = hashvalue(parent(node X))
    hashvalue = hashvalue + DOMHASH(node X)

end generate hashvalue

DOMHASH(node X)

If(node X is Comment)
        apply digestCalculation(node X)
    end if

If(node X is Processing Instruction)
        apply digestCalculation(node X)
    end if If(node X is Attribute)
        apply digestCalculation(@ + label(node X))
    end if If(node X is Element)
        apply digestCalculation(label(node X))
    end if end DOMHASH

FIG. 7

INDEXING XML DOCUMENTS EFFICIENTLY

RELATED APPLICATIONS

The present application claims priority to U.S. Provisional Application No. 60/500,568, entitled Storing and Indexing XML Natively in an Oracle RDBMS, filed by Sanjay M. Krishnamurthy on Sep. 4, 2003, the contents of which are incorporated herein by reference.

FIELD OF THE INVENTION

The present invention relates to storing and accessing data in a database, and in particular, efficiently accessing hierarchical data stored in a database system.

BACKGROUND OF THE INVENTION

The number of businesses exchanging information electronically is proliferating. Businesses that exchange information have recognized the need for a common standard for representing data. Extensible Markup Language ("XML") is rapidly becoming such a common standard.

XML describes and provides structure to a body of data, such as a file or data packet. The XML standard provides for tags that delimit a body of data into sections referred to as XML elements. Each XML element may contain one or more name-value pairs referred to as attributes.

Referring to FIG. 1, it shows XML document 101, provided to illustrate XML and XML elements. XML elements are delimited by a start tag and a corresponding end tag. For example, XML document 101 contains the start tag <A> (corresponding to <A id="0"> and the end tag </A> to delimit an element, and <D> and </D> to delimit another element. The data between the elements is referred to as the element's content.

An element is herein referred to by its start tag. For example, the element delimited by the start and end tags <A> and </A> is referred to as the A element.

Element content may contain various types of data, which may include attributes, other elements, and text data. Attributes of an element are represented by attribute name-value pairs. An attribute name-value pair specifies the attribute's name and value. For example, A contains the attribute name-value pair id='0', specifying an attribute name of id and an attribute value of the string literal '0'.

The elements A and C contain one or more elements. Specifically, A contains elements C and D, and C contains element D. An element that is contained by another element is referred to as a descendant of that element. Thus, C and D are descendants of A.

An XML document, such as XML document 101, is an example of an information hierarchy. An information hierarchy is a body of data items that are hierarchically related. In an XML document, the hierarchically related data items include elements and element attributes. By defining an element that contains attributes and descendant elements, an XML document defines a hierarchical tree relationship between the element, its descendant elements, and its attribute.

Because an XML document is an information hierarchy, each element contained therein may be located by following a "path" through the hierarchy to the item. Within an XML document, the path to an element begins at the root of the tree and down the hierarchy of elements to eventually arrive at the element of interest. For example, the path to D consists of elements A and C, in that order.

A convenient way to identify and locate a specific item of information stored in an information hierarchy is through the use of a "pathname". A pathname is a concise way of uniquely identifying an item based on the path through the hierarchy to the item. A pathname is composed of a sequence of names. In the context of an XML document, the names in a pathname are elements or element attributes. For example, '/A/C/D' identifies element D.

XML Storage Mechanisms

Various types of hierarchical storage mechanisms are used to store XML documents. One type stores an XML document as a text file in a file system.

Other types of hierarchical storage mechanisms store the parts of an XML document in a relational or object-relational database system. For example, an entire XML document may be stored in a blob (binary large object), or the parts of an XML document may be stored in different rows in one or more relational tables, each row containing one or more parts of an XML document. An XML document may also be stored as a hierarchy of objects in an object-relational database; each object is an instance of an object class and stores one or more elements of an XML document. The object class defines, for example, the structure of an element, and includes references or pointers to objects representing the immediate descendants of the element.

Storing XML documents in a database system has many advantages. Database systems are well suited for storing large amounts of information. Queries may be used to retrieve data that matches complex search criteria. The data may be easily and efficiently retrieved from a relational database system. However, database systems are not configured to retrieve efficiently, if at all, data for queries that request data identified by the data's location within an information hierarchy.

One way for a query to identify the requested data's location within an information hierarchy is through the use of a string that conforms to the standard prescribed in the document *XML Path Language (XPATH)*, version 1.0 (W3C Recommendation 16 Nov. 1999). The XPATH standard defines a syntax and semantic for addressing parts of a document. For example, the query "/A/B" requests the subtree descending from a descendant of A with the element name B. The query "/A/B/@id" requests the attribute id of a descendant of A with the element name B.

A query that requests data based on a position within a hierarchy is referred to herein as a hierarchical query. A hierarchical query that uses a string that conforms to XPATH to identify the location within a hierarchy of the requested data is referred to herein as an XPATH query. The process of retrieving the data requested by a hierarchical query is referred to herein as hierarchical retrieval.

One approach to hierarchical retrieval is to retrieve all the rows that store part of a XML document, construct an in-memory representation of the complete XML document, and then search and traverse the tree to get the requested data. XML documents can be quite large. The processing required to build an in-memory representation of a large XML document can be expensive and the amount of memory needed to store the in-memory representation can easily exceed available memory resources on a computer.

When all XML documents are stored as a set of objects in an object-relational database system, another approach can be used for hierarchical retrieval. The objects used to store the XML document can be traversed by following the references or pointers defining the hierarchical relationship between the objects. The advantage of this approach is that not all the objects used to represent an XML document need to be loaded into memory; only objects that are traversed need be loaded.

A disadvantage of this approach stems from the fact that object-relational database systems are limited in the number of object classes they can effectively handle. Representing an XML document with objects requires defining object classes for each type of element in the XML document. An object-relational database might have to be configured to define many object classes for many XML documents and store very many objects. Generally, an object-relational database system can efficiently and effectively handle only up to a threshold number of object types, a threshold that can be easily exceeded when using an object-relational database system to store XML documents.

Yet another approach is to store the data that defines each parent-child relationship in the hierarchy of a XML document, and use the data to determine which data to return for an XPATH query. For example, a table stores a XML document, each row of the table storing the content of an element. The table includes a column called parent, which stores a primary key identifier identifying the row representing the parent of an element. To retrieve data specified by an XPATH query, a query that conforms to the Structure Query Language ("SQL") can be formulated using, for example, a connect-by clause to identify the requested data.

The connect-by clause allows a user to issue SQL queries that request data based on the data's location within an information hierarchy. The data is returned by a relational database system in a way that reflects the hierarchical organization. The connect-by clause is used to specify the condition that defines the hierarchical relationship, which in the current example, is the hierarchical relationship defined by parent and the primary key identifier. The disadvantage of the approach is that it requires many join operations, especially when the query requests data based on a hierarchical location that includes many levels.

Based on the foregoing, it is clearly desirable to devise an approach for organizing and storing XML data, or any form of hierarchical data, that allows portions of an information hierarchy to be accessed more efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a diagram showing a relational table used to store an XML document according to an embodiment of the present invention.

FIG. 4 is a grid diagram showing examples of pattern-matching literals that may be used to find matching path signatures of set of nodes requested by a hierarchical query.

FIG. 5 is a diagram showing a relational table and index used to store an XML document according to an embodiment of the present invention.

FIG. 7 is a diagram showing pseudo-code for generating hash path signatures according to an embodiment of the present invention.

DETAILED DESCRIPTION OF THE INVENTION

A method and apparatus for efficiently storing and accessing an information hierarchy is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for efficiently storing and accessing information hierarchies stored in a relational or object-relational database system. A path signature, which can be similar to a pathname, is stored in a database system in association with data for the node identified by the pathname. For example, a path signature identifying an element is stored in a row that holds data for the element. To retrieve data for a hierarchical query that identifies the data requested using, for example, an XPATH string, a string pattern is generated that is matched by path signatures identified by the XPATH string. Pattern matching is then used to select rows associated with matching path signatures, and data from the selected rows is used to compute the XPATH query. Furthermore, hash values representing path signatures are generated in a way that preserves the ordering of data in an information hierarchy. The hash values can be stored in lieu of the path signatures and indexed to provide quick access to an information hierarchy.

Nodes in an Information Hierarchy

Figure 1:
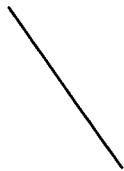
FIG. 1 is a diagram showing an XML document according to an embodiment of the present invention.
Figure 2:
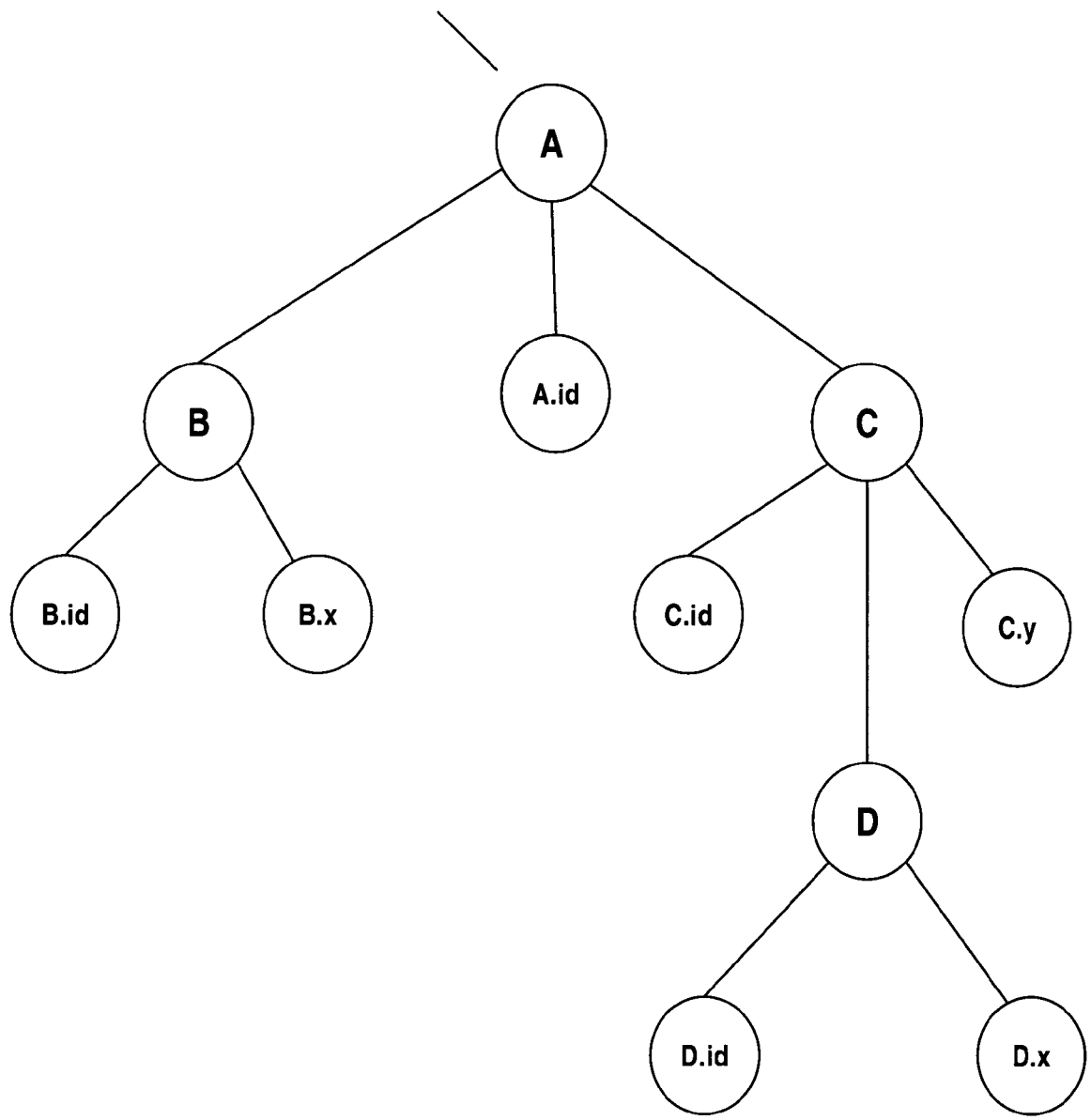
FIG. 2 is a diagram showing XML document as an information hierarchy according to an embodiment of the present invention.

FIG. 2 is a hierarchical diagram 201 depicting XML document 101 as an information hierarchy, provided herein to facilitate an understanding of embodiments of the invention. Hierarchical diagram 201 depicts nodes that correspond to elements or element attributes of XML document 101. Specifically, nodes A, B, C, and D correspond to elements A, B, C, and D in XML document 101. Nodes A.id and A.x correspond to attributes id and x of element A; nodes B.id and B.x correspond to attributes id and x of element B; nodes C.id and C correspond to attributes id and y of element C; nodes D.id and D.x correspond to attributes id and x of element D.

An information hierarchy can have different types of data items. For example, XML document 101 contains elements and element attributes. For convenience of expression, it is convenient to refer to a data item of any particular type in an information hierarchy as a node. For example, the statement "nodes B, A.id, and C are descendants of A" is a convenient way of stating that "elements B and C and element attribute A.id are descendants of A". The expression "all the nodes of A" is a convenient way of expressing "all the elements and element attributes of A."

The edge between node A and C represents the parent-child relationship between node A and C, respectively (i.e. element A and C, respectively). The edge between node C and D represents the parent-child relationship between node C and D. The edge between node D and node D.id represents the parent-child relationship between node D and node D.id; the edge between node D and node D.x represents the parent-child relationship between node D and node D.x.

In an information hierarchy, the nodes have a name, content and/or value. Node D has the value "More text", while node D.id has the value "300".

Nodes at the same level of an information hierarchy are referred to as sibling nodes. For example, node B and node C are siblings. Node D is a descendant of node C but not a sibling of node B.

Illustrative Relational Storage Mechanism for Storing an XML Document

FIG. 3 is a block diagram of a relational table NT 301, which stores nodes of a XML document 101, according to an embodiment of the present invention. Referring to FIG. 3, table NT 301 includes column path signature 302, node name 304, and value 306. Rows 311-319 in table NT 301 each store data for a node within XML document 101. For a particular row in table NT 301, column path signature 302 contains a "path signature" of the node corresponding to the row, node name 304 includes the name of the node, and value 306 contains the value of the node. A path signature is data that identifies the path or location of a node within an information hierarchy. The path signatures in path signature 302 are strings that conform to XPATH.

For example, row 311 stores data for node A.id (corresponding to the attribute id of element A). For row 311, path signature 302 contains the string value '/A/@id/', node name 304 contains 'id', and value 306 contains 0. For row 314, path signature 302 contains the value '/A/B', node name 304 contains 'B', and value 306 contains 'This is text'.

The term shredding refers to the process of dividing an XML document into the parts that are stored in a logical unit of storage, such as a row in a table or an object in an object table. The shredding approach used for shredding XML document 101 in table NT 301 is to store one node in one row. However, an embodiment of the present invention is not so limited. Multiple nodes may be stored in a row, object, or other type of logical unit of storage. The nodes stored in a particular row may form a subtree. For example, a row may contain data about an element and all attributes of the element. The information about the attributes could be stored in, for example, a blob column of the row. A column holding the path signature for a row can identify only the parent or can identify the parent and all of its attributes (XPATH defines approaches for identifying groups of nodes).

In addition, multiple tables or data structures may be used to store a shredded XML document. For example, some data for a node may be stored in another table separate from a table or index that stores a path signature for the node. The other table contains records or entries that associate a path signature with a row storing the data for a node. Furthermore, data representing the content of a node may be stored in more than one table. For example, a node may have a node value in the form of large string and/or have a large number of attributes. The name and path signature of a node are stored in one table, while the node value and attributes are stored in other data structures.

Using Pattern Matching

As mentioned before, an XPATH query includes an XPATH string that identifies a set of nodes in an XML document. According to an embodiment of the present invention, patterning matching is used to find rows in table NT 301 that hold data for nodes identified by an XPATH string. Specifically, data representing a string pattern is generated from an XPATH query and used to find rows storing path signatures that match the string pattern. The data from the rows with matching path signatures is used to generate the results of the XPATH query.

One common way to define a string pattern is to use a string (referred to herein as a "pattern-matching literal") that specifies in sequence specific characters to be matched and special pattern-matching characters to be matched. For example, the pattern-matching literal 'R %' begins with the specific character 'R' followed by the special pattern-matching character '%'. The pattern-matching literal specifies in sequence the pattern of a matching string. The specific character 'R' is only matched by 'R'. The character '%' is matched by a string of any length (including length 0). Thus, the pattern specified by pattern-matching literal 'R %' is any string that begins with R.

FIG. 4 shows exemplary XPATH queries and pattern-matching literals, which are used, in conjunction with table NT 301, to illustrate an embodiment of the present invention. Referring to FIG. 4, it shows grid 401. Each entry in grid 401 shows an XPATH string and pattern-matching literal that is used to select rows in table NT 301 that have a path signature that matches the string pattern.

Entry 402 shows that, for XPATH query '/A/C/', the pattern-matching literal '/A/C/%' may be used to find the path signatures of the nodes identified by the query. The XPATH query '/A/C/' identifies the subtree rooted at node C. The subtree would include node C and its attributes, C.id and C.y, and node D and its attributes, D.id and D.x. The rows in table NT 301 whose path signature match the pattern-matching literal '/A/D/%' are rows 315-319. These rows are retrieved by the following query:

select * from NT where path signature like '/A/D/%.

The above query conforms to SQL. The like operator is the pattern matching operator, which returns true if the left operand matches the pattern defined by the right operand.

Entry 404 shows that for XPATH query '/A//D/', the pattern-matching literal '/A/%/D/%' may be used to find the path signatures of nodes identified by the XPATH query '/A/D/'. The XPATH query 'A//D/' identifies all the descendants of node A with the name D. The descendants include node D and its attributes, D.id and D.x. The rows in table NT 301 that have matching path signatures are rows 317, 318, and 319.

The approaches for defining string patterns used here are illustrative but not limiting. There are many approaches that may be used for defining string patterns and determining which strings match the patterns; the present invention is not limited to any particular approach.

The *Oracle 9i SQL Reference*, release 2 (9.2), part Number A96540-01 describes further details about the Like operator and pattern matching, and is herein incorporated by reference. Patterning matching techniques are described in Thomas H. Cormen, Charles E. Leiserson, and Ronald L. Rivest. *Introduction to Algorithms*, MIT Press, 1992, incorporated herein by reference.

Ordered Hash Values as Path Signature

Storing path signatures as strings that represent pathnames results in duplicate storage of pathname prefixes. For example, the prefix '/A/C' is stored for all nodes of node C in table NT 301. If a pathname is long, as is the case for many XML documents, a relatively large amount of storage space is used to store duplicate information in the form of prefix strings. To reduce the amount of storage space needed to store a path signature, hash values are generated and used and stored as path signatures. Such hash values are referred to herein as hash path signatures. Hash path signatures represent a particular path or pathname. In general, the hash path signatures are much smaller (in terms of storage space needed to store them) than the pathnames they represent.

In addition, the hash path signatures are generated so that their order corresponds to the order of the pathnames. For example, the hash value generated for '/A/B' is less than that generated for 'A/B/A' or '/B/A' but greater than that generated '/A' or '/A/A'.

A result of generating hash path signatures in this way is that hash path signatures of all the descendants of a node occupy exclusively a range of hash path signatures. An index that has as key values hash path signatures has entries that are ordered by hash path signatures. The index entries for the descendants are therefore found in a consecutive set of entries. Index scans to find all the descendants of a node can thus be performed very efficiently by scanning only a range of consecutive entries for the descendants. XPATH queries frequently request nodes that share a prefix in their pathnames, or in other words, are descendents of a given root node. Thus, the descendants can be quickly identified by scanning only a range of entries within an index. Furthermore, the test to determine whether a row holds a node requested by a query is performed by determining whether a hash value falls within a range, an operation which can be performed more quickly than making a determination of whether a string matches a string pattern.

FIG. 5 is a block diagram that depicts a hash path signature based storage mechanism for XML document 101. Referring to FIG. 5, it shows relational table NT 501. Table NT 501 includes columns hash path signature 502, node name 504, and value 306. Rows 511-519 in table NT 501 each store data for a node within XML document 101. Similar to table NT 301, for a particular row, node name 504 stores the name of the node whose data is stored in the row, and value 506 contains the value of the node.

Column hash path signature 502 contains, for a particular row in table NT 501, a hash path signature of the node corresponding to the row. For example, in row 511, hash path signature 502 contains the hash value '15000012', the hash path signature for '/A/@id/'. For row 514, hash path signature 502 contains the value 15160000, the hash path signature for 'A/B'.

Index 530 indexes table NT 501 using hash path signature 502 as a key column. A key column is a column that contains key values of an index. Thus, entries within index 520 are ordered by hash path signature values within hash path signature 502. Each of entries 531-539 in index 530 associates a hash path signature to the row that stores data for a node in table NT 501. For example, entry 531 contains the hash path signature '15000012' and row-id 511, a row-id referring to row 511, thereby mapping the hash path signature '15000012' to row 511. A row-id identifies a row. For purposes of exposition, reference numerals used in FIG. 5 to refer to rows 510-519 are used as row-ids within entries 531-539.

Figure 6:
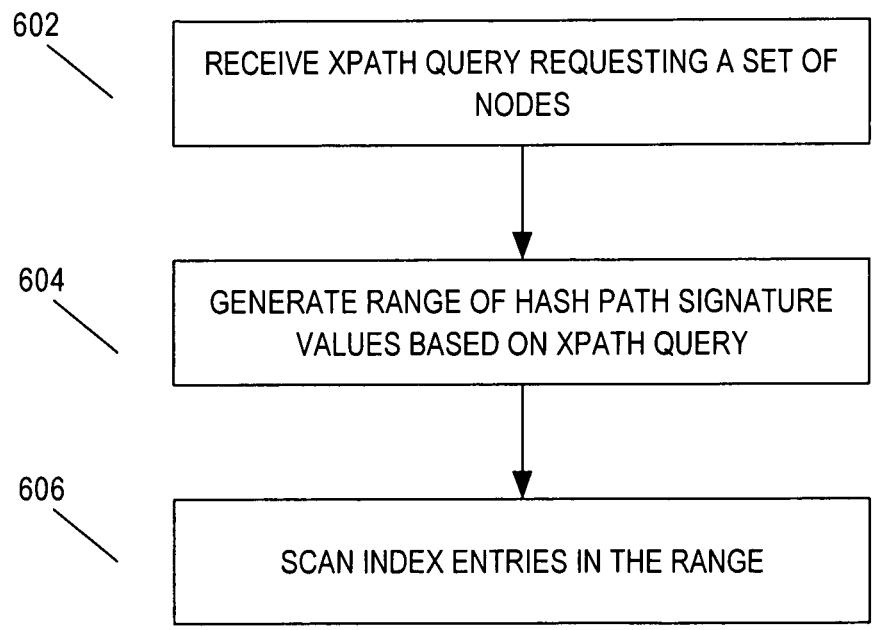
FIG. 6 is a flowchart depicting a process for finding rows holding data for nodes requested by a XPATH query.

FIG. 6 shows a flow chart of a process for finding rows that hold data requested by a XPATH query. The process is illustrated using table NT 501 and index 530.

Referring to FIG. 2, at step 602 an XPATH query is received, the XPATH query requesting a set of nodes. For example, an XPATH query is received that requests the nodes within XML document 101 identified by the XPATH string '/A/B'—the nodes of the subtree rooted at node B.

At step 604, a range of hash path signature values is generated based on the XPATH query received at step 602. This entails calculating the boundaries of the range into which the requested nodes must fall. In the current example, the beginning boundary is 15160000, inclusively and 15170000, exclusively. The node with the pathname 'A/B' and any descendants of the node must fall within this range.

At step 606, the entries within the range are scanned, beginning with entry 532 and ending with entry 534. The row-ids are retrieved from these entries and used to access table NT 501 to retrieve data needed to compute the received query.

Furthermore, the query may contain other criteria, such as requiring an element to have a particular value for an attribute. The data for the rows in table NT 501, once retrieved, may be further evaluated to determine whether the data has been requested by the query, and further processed to present or structure the data as needed to return the data to the issuer of the query.

Alternate Emdodiments

An embodiment of the present invention has been illustrated using hierarchical queries that are XPATH queries. However, the present invention is not limited to a particular type of hierarchical query. For example, a query may be in the form of a statement that conforms to a database language similar to SQL. Such a statement may contain a "hierarchical operator" that specifies requested data by specifying the data's location within an information hierarchy. Hierarchical operators are described in U.S. application Ser. No. 10/260, 138, entitled Operators for Accessing Hierarchical Data in a Relational System, filed on Sep. 9, 2002 by Nipun Agarwal, et al., the contents of which are incorporated herein by reference.

Neither is an embodiment of the present invention limited to a body of data that conforms to XML. An embodiment of the present invention may be used to efficiently store and access data from many types of information hierarchies, such as, for example, a file system. A typical file system has directories arranged in a hierarchy, and files or documents stored in the directories. A pathname for a document is composed of one or more directory and/or a file names. Path signature and hash path signatures can be generated from such names in a pathname.

Generating Hash Path Signatures

As mentioned before, hash path signatures are generated in a way that preserves the order of a node within a hierarchy based on the pathname of the node. FIG. 7 shows the psuedo-code of a procedure used to generate such hash values. The procedure is based on the standards and approaches for generating hash values prescribed by *Digest Values for DOM (DOMHASH)*, by H. Maruyama, K. Tamura, N. Uramoto, IBM (April 2000, RFC 2803), the contents of which are incorporated by reference.

Referring to FIG. 7, the procedure generate hashvalue generates a hash value for a node. The procedure generates a hash value by invoking the function DOMHASH, which returns a hash value. This hash value is concatenated to the hash value of the parent, if any.

Procedure DOMHASH generates a hash value based on the node's type, which may be Comment, Processing Instruction, Attribute, or Element, by applying the procedure for calculating digest values (i.e., apply digestCalculat ion) described in *Digest Values for DOM (DOMHASH)*. The function invocation label (node X) returns the name of a given node. The invocation digestCalculation (@+label (node X)) applies the procedure for calculating digest values to the concatenation of the character '@' to the name of a given node X. The procedure digestCalculation can use the MD5 or SHA-1 algorithms, which are well known methods for generating hash values or digital signatures.

Making Changes to Tables When Stored XML Documents Change

A subtree within an XML document may be added or removed, necessitating a change to a table that stores the XML document. Each node stored in the table is associated with range of path signatures in the nodes subtree. The addition or removal of a subtree may require range associated the subtree's parent may be updated to reflect the addition or removal of the subtree.

When modifying a subtree within a table, the rows that store the subtree should be exclusively locked before modifying the rows. This may be accomplished by using a "Select-for-Update" command, as defined by SQL, to modify the rows.

Hardware Overview

Figure 8:
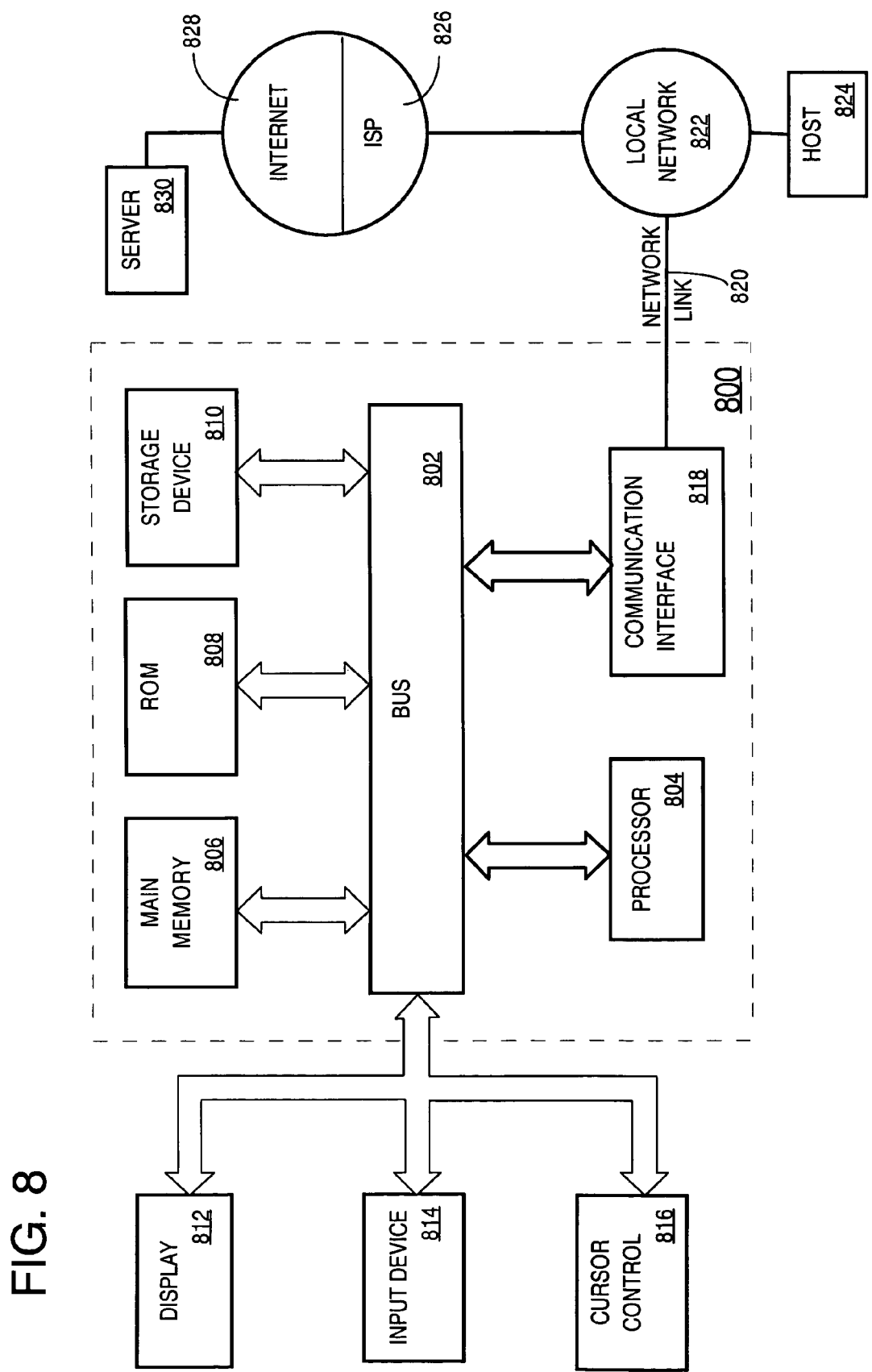
FIG. 8 is a computer system that may be used to implement an embodiment of the present invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 80 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 81 coupled to bus 802. Communication interface 81 provides a two-way data communication coupling to a network link 820 that is connected to a local network 822. For example, communication interface 81 may be an integrated services digital network (ISDN) card or a modem to provide a data communication connection to a corresponding type of telephone line. As another example, communication interface 81 may be a local area network (LAN) card to provide a data communication connection to a compatible LAN. Wireless links may also be implemented. In any such implementation, communication interface 81 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 82. Local network 822 and Internet 82 both use electrical, electromagnetic or optical signals that carry digital data streams. The signals through the various networks and the signals on network link 820 and through communication interface 81, which carry the digital data to and from computer system 800, are exemplary forms of carrier waves transporting the information.

Computer system 800 can send messages and receive data, including program code, through the network(s), network link 820 and communication interface 81. In the Internet example, a server 830 might transmit a requested code for an application program through Internet 82, ISP 826, local network 822 and communication interface 81.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for providing access to data for nodes, each node of said nodes belonging to an information hierarchy, wherein said data for said nodes are stored in a plurality of rows of a table, the method comprising the steps of:
    generating a plurality of hash values that reflects an order of a plurality of pathnames associated with said nodes, wherein each hash value in the plurality of hash values is generated based on character values of a particular pathname in the plurality of pathnames, the order being character-based;
    wherein each pathname of said plurality of pathnames corresponds to a row of said plurality of rows and identifies a location within an information hierarchy that includes a node whose data is stored in the row; and
    storing, in a database, said plurality of hash values in an index that associates said plurality of hash values with said plurality of rows;
    wherein said index is ordered by said plurality of hash values as key values;
    identifying a range of hash values based on a path that includes one or more nodes;
    scanning said index based on said range of hash values to find one or more rows corresponding to said range of hash values, wherein said one or more rows store data of one or more descendant nodes to said one or more nodes; and
    retrieving said data of said one or more descendant nodes from said one or more rows;
    wherein the method is performed by one or more computing devices.

2. The method of claim 1, further comprising:
    calculating said range of hash values based on a set of nodes requested by a query.

3. The method of claim 1, wherein said plurality of hash values are stored in a column of said table.

4. The method of claim 1, wherein said data for nodes of said information hierarchy includes data that conforms to XML.

5. The method of claim 1, wherein said plurality of hash values are generated by a hash value function that conforms to DOMHASH.

6. The method of claim 1, wherein:
    wherein a particular information hierarchy includes a first node of said nodes and a second node of said nodes that is a sibling of said first node, wherein said first node has descendant nodes;
    the first node is first in said order relative to the second node; and
    the step of generating a plurality of hash values guarantees that the plurality of hash values associated with descendant nodes is less than a hash value associated with said second node.

7. The method of claim 6, wherein:
    said information hierarchy includes a third node that is a sibling of said first node;
    the third node is first in said order relative to said first node; and
    the step of generating a plurality of hash values guarantees that the plurality of hash values associated with both said first node and said descendant nodes are greater than a hash value generated for said third node or all descendants of said third node.

8. A non-transitory computer-readable storage medium storing one or more sequences of instructions for providing access to data for nodes, each node of said nodes belonging to an information hierarchy, wherein said data for said nodes are stored in a plurality of rows of a table, wherein said one or more sequences of instructions, when executed by one or more processors, causes the one or more processors to perform:
    generating a plurality of hash values that reflects an order of a plurality of pathnames associated with said nodes, wherein each hash value in the plurality of hash values is generated based on character values of a particular pathname in the plurality of pathnames, the order being character-based;
    wherein each pathname of said plurality of pathnames corresponds to a row of said plurality of rows and identifies a location within an information hierarchy that includes a node whose data is stored in the row; and
    storing, in a database, said plurality of hash values in an index that associates said plurality of hash values with said plurality of rows;
    wherein said index is ordered by said plurality of hash values as key values;
    identifying a range of hash values based on a path that includes one or more nodes;
    scanning said index based on said range of hash values to find one or more rows corresponding to said range of hash values, wherein said one or more rows store data of one or more descendant nodes to said one or more nodes; and
    retrieving said data of said one or more descendant nodes from said one or more rows.

9. The medium of claim 8, wherein the one or more sequences of instructions further comprise instructions which, when executed by one or more processors, causes the one or more processors to perform:
    calculating said range of hash values based on a set of nodes requested by a query.

10. The medium of claim 8, wherein said plurality of hash values are stored in a column of said table.

11. The medium of claim 8, wherein said data for nodes of said information hierarchy includes data that conforms to XML.

12. The medium of claim 8, wherein said plurality of hash values are generated by a hash value function that conforms to DOMHASH.

13. The medium of claim 8, wherein:
    wherein a particular information hierarchy includes a first node of said nodes and a second node of said nodes that is a sibling of said first node, wherein said first node has descendant nodes;
    the first node is first in said order relative to the second node; and
    the step of generating a plurality of hash values guarantees that the plurality of hash values associated with descendant nodes is less than a hash value associated with said second node.

14. The medium of claim 13, wherein:
    said information hierarchy includes a third node that is a sibling of said first node;
    the third node is first in said order relative to said first node; and
    the step of generating a plurality of hash values guarantees that the plurality of hash values associated with both said first node and said descendant nodes are greater than a hash value generated for said third node or all descendants of said third node.

\* \* \* \* \*